Figure 6:
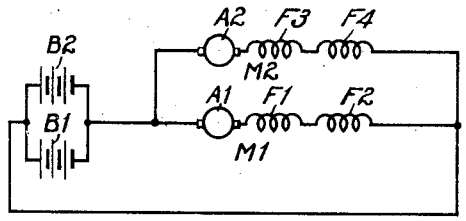
Figure 7:
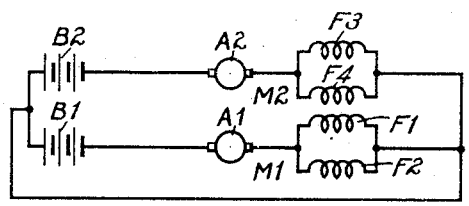

A. H. CANDEE.
SYSTEM OF CONTROL.
APPLICATION FILED FEB. 3, 1917.
1,352,427.
Patented Sept. 14, 1920.
2 SHEETS—SHEET 1.
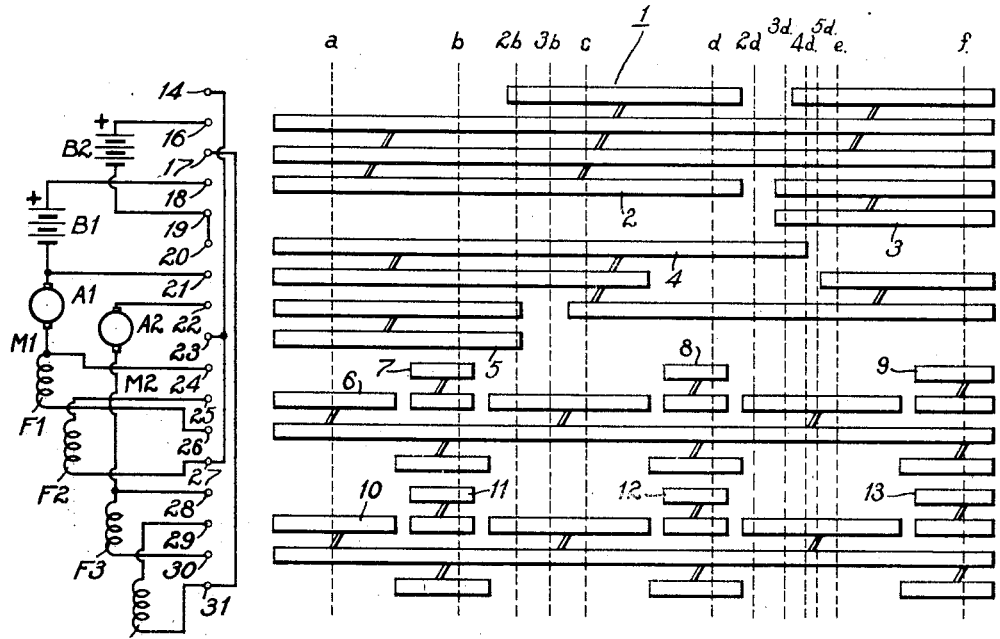
Fig. 1.
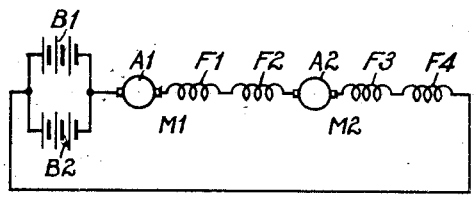
Fig. 2. a.
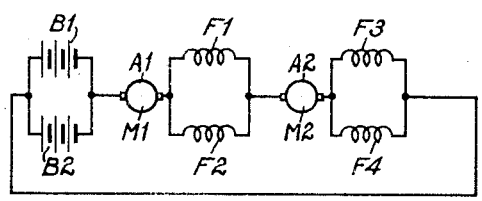
Fig. 3. b.
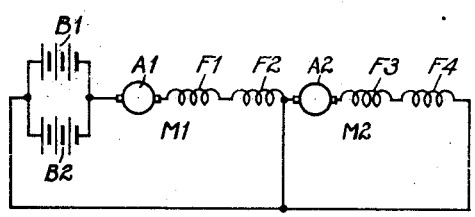
Fig. 4. 2b.
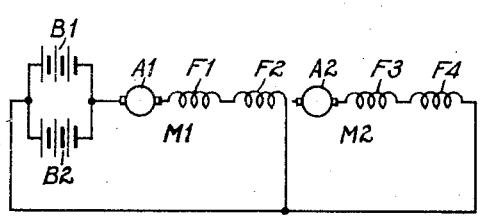
Fig. 5. 3b.
WITNESSES:
R.J. Fitzgerald
W. B. Wells.
INVENTOR
Andrew H. Candee.
BY
Wesley G. Carr
ATTORNEY

A. H. CANDEE.
SYSTEM OF CONTROL.
APPLICATION FILED FEB. 3, 1917.

1,352,427.

Patented Sept. 14, 1920.
2 SHEETS—SHEET 2.

WITNESSES:
R. J. Fitzgerald.
W. B. Wells.

INVENTOR
Andrew H. Candee.
BY
Wesley G. Carr
ATTORNEY

UNITED STATES PATENT OFFICE.

ANDREW H. CANDEE, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,352,427. Specification of Letters Patent. Patented Sept. 14, 1920.

Application filed February 3, 1917. Serial No. 146,456.

*To all whom it may concern:*

Be it known that I, ANDREW H. CANDEE, a citizen of the United States, and a resident of Pittsburgh, in the county of Allegheny and State of Pennsylvania, have invented a new and useful Improvement in Systems of Control, of which the following is a specification.

My invention relates to systems of control and particularly to systems of control for electric vehicles which are propelled by storage batteries.

One object of my invention is to provide a control system for a plurality of propelling motors which shall accelerate the motors in series and in parallel-circuits relation without the use of accelerating resistors and while maintaining the motor circuit closed.

Another object of my invention is to provide a control system of the above-indicated character for connecting the motors contained therein in various circuit relations with a plurality of sources of energy which may be arranged in series and in parallel-circuit relation.

More specifically, my invention embodies a control system having a plurality of propelling motors, each of which is provided with an armature and a plurality of field windings. A plurality of sources of energy will be inserted in circuit with the motors and a controller will be provided for connecting the sources of energy, the motors and the field windings in series and in parallel-circuit relation.

Control systems have been constructed for storage-battery locomotives wherein the acceleration of the motors in series and in parallel-circuit relation is accomplished by means of accelerating resistors which necessarily entail a considerable loss of energy.

However, according to my invention, the storage battery and the field windings of each motor are divided into sections. A controller is provided for placing the battery sections, the motors and the field winding sections in series and in parallel-circuit relation, whereby the motors may be accelerated without extended loss of energy and the motor circuit maintained closed.

In the accompanying drawings, Figure 1 is a diagrammatic view of a control system embodying my invention; and Figs. 2 to 13, inclusive, are diagrammatic views of the various circuits which are completed through the motors in the various positions of the controller.

Referring to the accompanying drawings, two motors M1 and M2, embodying armatures A1 and A2 and field windings F1 and F2 and F3 and F4, are adapted to be connected to storage batteries B1 and B2 by means of a controller 1. The controller 1 embodies movable contact segments 2 to 13, inclusive, which engage contact fingers 14 and 16 to 31, inclusive, to connect the batteries B1 and B2, motors M1 and M2 and the field windings F1 to F4, inclusive, in series and in parallel-circuit relation relative to each other.

When the controller is moved to position $a$, a circuit is completed in series through the motors M1 and M2 and the parallel-connected batteries B1 and B2, which may be traced from one terminal of the armature A1 through the field winding F1, contact finger 26, controller segment 6, contact finger 25, field winding F2, contact fingers 22 and 23, which are bridged by the controller segment 5, armature A2, field winding F3, contact fingers 29 and 30, which are bridged by the controller segment 10, field winding F4, contact finger 17 and controller segment 2, where the circuit divides, one branch extending from the controller segment 2 through the contact finger 16, battery B2, contact finger 20, controller segment 4 and contact finger 21 to the armature A1, and the second branch extending from the controller segment 2 through the contact finger 18 and the battery B1 to the armature A1. Thus, a circuit is completed through the motors M1 and M2 and the batteries B1 and B2, as is illustrated in Fig. 2 of the drawings.

In case the controller is moved to position $b$, the field winding sections F1 and F2 and F3 and F4 are respectively placed in series-parallel relation relative to the armatures A1 and A2, as is illustrated in Fig. 3 of the drawings. The circuit through the motors may be traced from the armature A1, where the circuit divides, one branch extending through the field winding F1, contact finger 26 and controller segment 6 to the contact finger 27, and the second branch extending through the contact finger 24, controller segment 7, contact finger 25 and field winding F2 to the contact fingers 22 and 23, which are bridged by the controller segment 5, and armature A2 where the circuit divides, one branch extending through the field winding F3, contact finger 30 and the controller segment 10 to the contact terminal 31, and the second branch extending through the contact finger 28, controller segment 11, contact finger 29 and the field winding section F4 to the contact finger 31, contact finger 17 and controller segment 2 in parallel through the batteries B1 and B2 to the armature A1.

Between position b and position c are two transition positions 2b and 3b. In the transition position 2b, the motors M1 and M2 are returned to series-circuit relation, as illustrated in Fig. 2 of the drawings, and the motor M2 is shunted by means of the controller segment 2 engaging contact fingers 14, as is diagrammatically illustrated in Fig. 4 of the drawings. In the transition position 3b, the controller segment 5 is disengaged from contact with the contact fingers 22 and 23 to exclude the motor M2 from the circuit of the batteries B1 and B2, as is illustrated in Fig. 5 of the drawings.

When the controller is moved to position c, the controller segment 4 engages the contact finger 22 to place the batteries and the motors in series-parallel circuit relation relative to each other, as is illustrated in Fig. 6 of the drawings.

When the controller is moved to position d, the battery B2 is connected in series with the motor M2, the field-winding sections F3 and F4 of which are connected in parallel relation relative to each other, and the battery B1 is connected in series with the motor M1, the field-winding sections F1 and F2 of which are connected in parallel relation relative to each other. The circuit through the motor M1 may be traced from one terminal of the battery B1 through the armature A1 where the circuit divides, one branch extending through the field winding F1, contact finger 26, and controller segment 6 to the contact finger 27, and the other branch extending through the contact finger 24, controller segment 8, contact finger 25 and the field winding F2 to the contact finger 27, where the two branch circuits unite, contact finger 14, controller segment 2 and the contact finger 17 to the other terminal of the battery B1. The circuit through the motor M2 may be traced from one terminal of the battery B2 through contact fingers 20 and 22, which are bridged by the controller segment 14, armature A2 where the circuit divides, one branch extending through the field winding F3, contact finger 30 and controller segment 10 to the contact finger 31, and the second branch extending through contact finger 28, controller segment 12, contact finger 29 and the field winding F4 to the contact finger 31, where the two branch circuits unite, contact finger 17, controller segment 2 and contact finger 16 to the other terminal of the battery B2.

Figure 8:
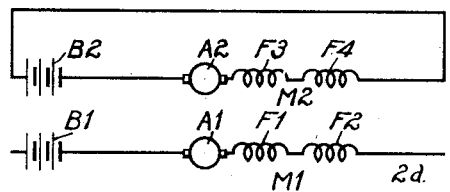
Figure 9:
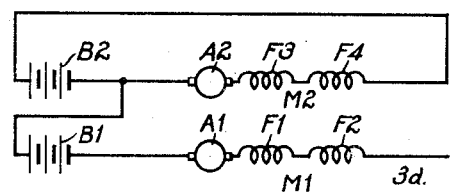

Between position d and position e are four transition positions 2d, 3d, 4d and 5d during which the batteries are changed from parallel-circuit relation to series-circuit relation. In the transition position 2d, the battery B1 and the motor M1 are excluded from the motor circuit and the battery B2 and the motor M2 are connected in series-circuit relation, as is illustrated in Fig. 8 of the drawings. The circuit through the motor M2 may be traced from one terminal of the battery B2 through contact fingers 20 and 22, which are bridged by the controller segment 4, armature A2, field winding F3, contact fingers 29 and 30, which are bridged by the controller segment 10, field winding F4, contact finger 17, controller segment 2 and the contact finger 16 to the other terminal of the battery B2. In the transition position 3d, one terminal of the battery B1 is connected to the battery B2, as is illustrated in Fig. 9 of the drawings.

Figure 10:
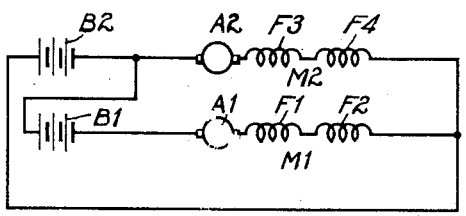
Figure 11:
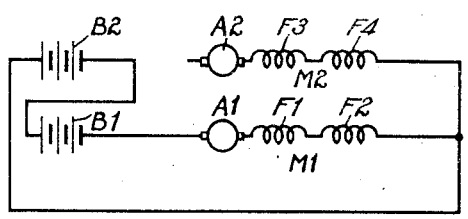

In the transition position 4d, the motor M2 is connected in series with the battery B2, as was traced in describing the transition position 2d, and the motor M1 is connected in series with the batteries B1 and B2, as is illustrated in Fig. 10 of the drawings. The circuit through the motor M1 may be traced from one terminal of the battery B1 through the armature A1, field winding F1, contact fingers 25 and 26, which are bridged by the controller segment 6, field winding F2, contact finger 14, controller segment 2, contact finger 16, battery B2, and the contact fingers 17 and 19, which are bridged by the controller segment 3, to the other terminal of the battery B1. In the transition position 5d, the controller segment 4 is disengaged from contact with the contact finger 20, and the motor M2 is excluded from circuit of the battery B2, as is illustrated in Fig. 11 of the drawings.

Figure 12:
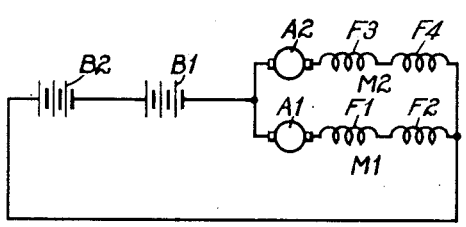

In position e, the batteries B1 and B2 are connected in series-circuit relation and the motors M1 and M2 are connected in parallel-circuit relation, as is illustrated in Fig. 12 of the drawings. The circuit through the motors M1 and M2 may be traced from one terminal of the battery B2 through the contact fingers 18 and 19 which are bridged by the controller segment 3, battery B1 where the circuit divides, one branch extending through the armature A1, field winding F1, contact fingers 25 and 26, which are bridged by the controller segment 6, and the field winding F2 to the contact finger 14, and the second branch extending through the contact fingers 21 and 22, which are bridged by the controller segment 4, armature A2, field winding F3, contact fingers 29 and 30, which are bridged by the controller segment 10, and field winding F4 to the contact finger 14, where the two branch circuits unite, controller segment 2 and the contact finger 16 to the other terminal of the battery B2.

Figure 13:
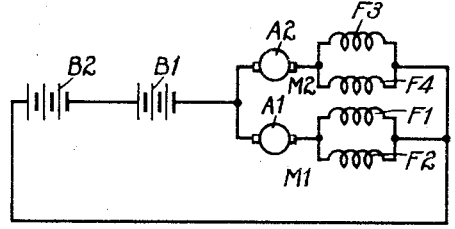

In position *f* of the controller, the field winding sections F3 and F4 and F1 and F2 are placed in parallel-circuit relation, as is illustrated in Fig. 13 of the drawings.

Variations in the structure and arrangement and location of parts may be made within the spirit and scope of my invention and such modifications are intended to be covered by the appended claims.

I claim as my invention:

1. In a system of control, the combination with a plurality of sources of energy and a plurality of motors, of means for operating the motors in series relation and the batteries in parallel relation, for connecting the batteries in series with one motor, and for operating the batteries in series and the motors in parallel-circuit relation.

2. In a system of control, the combination with a plurality of storage batteries and a plurality of motors, each of said motors having an armature and a plurality of field windings, of means for connecting the batteries in parallel and in series-circuit relation, for connecting the motors in various circuit relations and for connecting the field windings of each motor in various circuit relations relative to the armature associated therewith, the motor circuit being maintained closed and free from resistors.

3. In a system of control for a storage battery locomotive, the method which consists in connecting parallel-connected batteries in circuit with series-connected motors, connecting the motor field windings in series-parallel relation to the armatures associated therewith, connecting the batteries in series and the motors in parallel relation, and connecting the field windings of each motor in series-parallel relation to the armature associated therewith.

4. In a system of control, the method of changing a plurality of sources of energy from parallel to series-circuit relation when connected in circuit with a plurality of motors, which consists in connecting one source in series with one of the motors, connecting the two sources in series with one motor and one source in series with one motor, excluding one motor from circuit and connecting the two motors in parallel relation with the series-connected batteries.

5. In a system of control, the method of changing a plurality of sources of energy from parallel to series-circuit relation when connected in circuit with a plurality of motors, which consists in connecting one battery in series with one of the motors, connecting the two batteries in series with one motor and connecting the two motors in parallel relation with the series-connected batteries.

6. The method of operating a plurality of motors and sources of energy in various circuit relations which consists in connecting said sources in one relation with said motors in another relation, connecting the motor field windings and armatures in series-parallel relation, changing the individual relations of said sources and said motors, and connecting the field windings of each motor in series-parallel relation to the corresponding armature.

In testimony whereof, I have hereunto subscribed my name this 26th day of Jan., 1917.

ANDREW H. CANDEE.